(12) United States Patent
Tamori et al.

(10) Patent No.: US 8,859,699 B2
(45) Date of Patent: Oct. 14, 2014

(54) NON-SPECIFIC ADSORPTION INHIBITOR

(75) Inventors: Kouji Tamori, Tsukuba (JP); Eiji Takamoto, Tsukuba (JP); Toshihiro Ogawa, Tsukuba (JP)

(73) Assignee: JSR Corporation, Tokyo (JP)

( * ) Notice: Subject to any disclaimer, the term of this patent is extended or adjusted under 35 U.S.C. 154(b) by 338 days.

(21) Appl. No.: 12/602,138

(22) PCT Filed: May 19, 2008

(86) PCT No.: PCT/JP2008/059101
§ 371 (c)(1),
(2), (4) Date: Apr. 9, 2010

(87) PCT Pub. No.: WO2008/146631
PCT Pub. Date: Dec. 4, 2008

(65) Prior Publication Data
US 2010/0204424 A1 Aug. 12, 2010

(30) Foreign Application Priority Data
May 30, 2007 (JP) .................................. 2007-143017

(51) Int. Cl.
*C08F 222/36* (2006.01)
*C08F 20/58* (2006.01)
*C08F 26/10* (2006.01)
*C08F 220/52* (2006.01)

(52) U.S. Cl.
CPC .................................. *C08F 220/52* (2013.01)
USPC ..... 526/303.1; 526/264; 526/304; 526/307.2; 526/307.7

(58) Field of Classification Search
CPC .. C08F 2800/10; C08F 2800/20; C08F 33/24; B01J 20/261
USPC ................. 526/303.1, 264, 304, 307.2, 307.7
See application file for complete search history.

(56) References Cited

U.S. PATENT DOCUMENTS

| | | | | |
|---|---|---|---|---|
| 2002/0029968 | A1* | 3/2002 | Tan et al. | 204/454 |
| 2002/0103352 | A1* | 8/2002 | Sudor | 536/23.1 |
| 2005/0074478 | A1 | 4/2005 | Ofstead et al. | |
| 2006/0091015 | A1 | 5/2006 | Lau | |
| 2006/0223126 | A1 | 10/2006 | Tamori et al. | |
| 2007/0099814 | A1 | 5/2007 | Tamori et al. | |
| 2007/0224424 | A1 | 9/2007 | Tamori et al. | |
| 2008/0026222 | A1 | 1/2008 | Tamori et al. | |
| 2008/0078974 | A1 | 4/2008 | Tamori et al. | |
| 2008/0160167 | A1 | 7/2008 | Tamori et al. | |
| 2008/0160277 | A1 | 7/2008 | Tamori et al. | |
| 2009/0014682 | A1 | 1/2009 | Takahashi et al. | |
| 2009/0124707 | A1 | 5/2009 | Tamori et al. | |
| 2009/0234090 | A1 | 9/2009 | Ogawa et al. | |

FOREIGN PATENT DOCUMENTS

| | | |
|---|---|---|
| JP | 8-193103 | 7/1996 |
| JP | 10 153599 | 6/1998 |
| JP | 11 352127 | 12/1999 |
| JP | 3443891 | 6/2003 |
| JP | 2004 286558 | 10/2004 |
| JP | 2006 266743 | 10/2006 |
| JP | 2006 322709 | 11/2006 |
| JP | 2007 510889 | 4/2007 |
| JP | 2007 171054 | 7/2007 |

OTHER PUBLICATIONS

Teramae, Atsushi et al., "Microfabricated Device Made from UV Curable Resin for High Speed Polymerase Chain Reaction", Polymer Chemistry Laboratory, vol. 13, pp. 67 to 74, ISSN 0917-7841, (2001), (with English abstract).
U.S. Appl. No. 13/025,273, filed Feb. 11, 2011, Takahashi, et al.
U.S. Appl. No. 13/121,124, filed Mar. 25, 2011, Tamori, et al.
U.S. Appl. No. 13/152,802, filed Jun. 3, 2011, Tamori, et al.
Extended European Search Report issued Nov. 4, 2010, in European Patent Application No. 08752921.0.
U.S. Appl. No. 13/218,494, filed Aug. 26, 2011, Tamori, et al.
U.S. Appl. No. 13/763,236, filed Feb. 8, 2013, Takahashi, et al.
Japanese Office Action issued Jun. 12, 2013 in Patent Application No. 2009-516252 with Partial English Translation.

* cited by examiner

*Primary Examiner* — Ling Choi
*Assistant Examiner* — Chun-Cheng Wang
(74) *Attorney, Agent, or Firm* — Oblon, Spivak, McClelland, Maier & Neustadt, L.L.P.

(57) ABSTRACT

A non-specific adsorption inhibitor includes a water-soluble polymer obtained by polymerizing a monomer unit that includes a monomer (A) that forms a polymer that has a lower critical solution temperature (LCST) of 80° C. or less in an aqueous solution under normal pressure when subjected to homopolymerization, and a monomer (B) that forms a polymer that does not have the LCST in an aqueous solution under normal pressure when subjected to homopolymerization.

20 Claims, No Drawings

NON-SPECIFIC ADSORPTION INHIBITOR

This application is a 371 of PCT/JP08/59101 filed May 19, 2008. Priority to Japanese patent application 2007-143017, filed May 30, 2007, is claimed.

TECHNICAL FIELD

The present invention relates to a non-specific adsorption inhibitor that prevents non-specific adsorption of various proteins and the like used for a clinical diagnostic agent, a clinical diagnostic device, a biochip, and the like.

BACKGROUND ART

In recent years, an increase in inspection sensitivity has been desired in order to detect diseases in an early stage. Therefore, it is important to increase the sensitivity of diagnostic agents. In order to increase the sensitivity of diagnostic agents using a solid phase (e.g., polystyrene plate or magnetic particles), a method that utilizes enzyme coloring has been replaced by a method that utilizes fluorescence or chemiluminescence that achieves higher sensitivity. However, sufficient sensitivity has not been achieved. Specifically, in a diagnosis that detects a specific substance in the presence of biomolecules (e.g., blood serum), a biomolecule, a secondary antibody, a luminescence substrate, and the like are non-specifically adsorbed on a solid phase, an instrument, a container, or the like. As a result, an increase in sensitivity is hindered due to an increase in noise. Therefore, in order to suppress a decrease in sensitivity due to non-specific adsorption of a substance other than the substance showing specific adsorption on a solid-phase surface, an instrument, a container, or the like used for an immunological reaction, a biological substance (e.g., albumin, casein, or gelatin) is normally used for immunoassay as a non-specific adsorption inhibitor to suppress non-specific adsorption and reduce noise.

However, non-specific adsorption still occurs even if the non-specific adsorption inhibitor is added. Moreover, a biological non-specific adsorption inhibitor may cause biological infection (e.g., bovine spongiform encephalopathy (BSE)). Therefore, development of a high-performance, non-specific adsorption inhibitor obtained by chemical synthesis has been desired.

As a non-specific adsorption inhibitor obtained by chemical synthesis, JP-A-10-153599 and JP-A-11-352127 disclose polymers containing polyoxyethylene, and Japanese Patent No. 3443891 discloses a specific methacrylic copolymer. However, these polymers exhibit an insufficient non-specific adsorption inhibition effect.

DISCLOSURE OF THE INVENTION

An object of the invention is to provide a non-specific adsorption inhibitor that does not solidify over a wide temperature range, and can prevent non-specific adsorption of a protein or the like on a solid-phase surface, an instrument, a container, and the like used for chemiluminescent immunoassay and the like.

The inventors of the invention found that a copolymer having a specific composition exhibits a high non-specific adsorption inhibition effect and achieves the above object. This finding has led to the completion of the invention.

According to one aspect of the invention, there is provided a non-specific adsorption inhibitor comprising a water-soluble polymer obtained by polymerizing a monomer unit that includes a monomer (A) that forms a polymer that has a lower critical solution temperature (LCST) of 80° C. or less in an aqueous solution under normal pressure, and a monomer (B) that forms a polymer that does not have the LCST in an aqueous solution under normal pressure.

In the above non-specific adsorption inhibitor, the monomer (A) may be N,N-diethylacrylamide.

Since the above non-specific adsorption inhibitor includes the water-soluble polymer obtained by polymerizing the monomer unit that includes the monomers (A) and (B), the non-specific adsorption inhibitor does not solidify over a wide temperature range and can prevent non-specific adsorption of a protein or the like on a solid-phase surface, an instrument, a container, and the like used for chemiluminescent immunoassay and the like.

BEST MODE FOR CARRYING OUT THE INVENTION

A non-specific adsorption inhibitor according to one embodiment of the invention is described below.

1. Non-Specific Adsorption Inhibitor

1.1. Configuration and Production of Non-Specific Adsorption Inhibitor

The non-specific adsorption inhibitor according to this embodiment includes a water-soluble polymer obtained by polymerizing a monomer unit that includes a monomer (A) that forms a polymer that has a lower critical solution temperature (LCST) of 80° C. or less in an aqueous solution under normal pressure when subjected to homopolymerization, and a monomer (B) that forms a polymer that does not have the LCST in an aqueous solution under normal pressure when subjected to homopolymerization.

The composition of the monomer unit used to produce the water-soluble polymer is described below.

1.1-1. Monomer (A)

The monomer (A) forms a polymer that has an LCST of 80° C. or less in an aqueous solution under normal pressure when subjected to homopolymerization.

When a protein has been denatured during storage, the intramolecular conformation of the protein changes so that the protein changes from a hydrophilic state to a hydrophobic state, and induces denaturation of other proteins due to hydrophobicity. A polymer that has an LCST of 80° C. or less in an aqueous solution under normal pressure is considered to inhibit aggregation of denatured proteins due to the hydrophilic/hydrophobic balance to maintain the dispersion state. The monomer that can form a polymer that has an LCST of 80° C. or less in an aqueous solution under normal pressure is a component indispensable for providing a non-specific adsorption inhibition effect.

The monomer (A) may be used either individually or in combination.

Examples of the monomer (A) include N,N-diethylacrylamide, N-isopropylacrylamide, N-n-propylacrylamide, acryloylmorpholine, dimethylaminoethyl methacrylate, vinyl methyl ether, and the like.

The monomer (A) is preferably an acrylic monomer containing an acrylamide derivative from the viewpoint of excellent copolymerizability. The monomer (A) is more preferably N,N-diethylacrylamide from the viewpoint of a high non-specific adsorption inhibition effect.

1.1-2. Monomer (B)

The monomer (B) forms a polymer that does not have the LCST in an aqueous solution under normal pressure when subjected to homopolymerization. The monomer (B) may be used either individually or in combination.

Examples of the monomer (B) include substituted or unsubstituted acrylamides such as acrylamide, N,N-dimethylacrylamide, and N-hydroxyethylacrylamide; (meth)acrylates such as hydroxyethyl acrylate, polyethylene glycol mono(meth)acrylate, polyethylene glycol monomethyl ether (meth)acrylate, and glycerol(meth)acrylate; a monomer that forms a water-soluble polymer by hydrolysis after polymerization, such as vinyl acetate, glycidyl(meth)acrylate, and allyl glycidyl ether; and other monomers such as N-vinylacetamide, N-vinylpyrrolidone, and allyl alcohol.

The monomer (B) is a component indispensable for preventing precipitation and solidification of the non-specific adsorption inhibitor over a wide temperature range (particularly a high temperature range) while maintaining or enhancing the non-specific adsorption inhibition effect. The monomer (B) is preferably a substituted or unsubstituted acrylamide, and more preferably N,N-dimethylacrylamide.

1.1.3. Composition and Polymerization of Monomer Unit

The water-soluble polymer may be produced by copolymerizing the monomers (A) and (B) with a monomer (C) such as a carboxyl group-containing anionic monomer (e.g., acrylic acid, methacrylic acid, itaconic acid, maleic anhydride, or crotonic acid), a sulfone group-containing anionic monomer (e.g., styrenesulfonic acid, isoprenesulfonic acid, or 2-acrylamide-2-methylpropanesulfonic acid), a primary to quaternary amino group-containing cationic monomer (e.g., a methyl chloride quaternary salt of allylamine, aminostyrene, N,N-dimethylaminopropylacrylamide, or N,N-dimethylaminopropylacrylamide), or a hydrophobic monomer (e.g., methyl(meth)acrylate, ethyl(meth)acrylate, propyl(meth)acrylate, butyl(meth)acrylate, lauryl(meth)acrylate, cyclohexyl(meth)acrylate, isobornyl(meth)acrylate, benzyl(meth)acrylate, or styrene).

When the water-soluble polymer is produced by copolymerizing the monomers (A) and (B) with 1 to 10 wt % of an anionic monomer (particularly styrenesulfonic acid, isoprenesulfonic acid, 2-acrylamide-2-methylpropanesulfonic acid, or the like) as the monomer (C), a signal of a non-specific specimen may be inhibited when the water-soluble polymer is used in a diluent for an immunodiagnostic agent.

The monomer unit used to produce the water-soluble polymer (i.e., non-specific adsorption inhibitor) according to this embodiment preferably contains 30 to 99 wt % of the monomer (A), 1 to 70 wt % of the monomer (B), and 0 to 49 wt % of the monomer (C), and more preferably contains 40 to 95 wt % of the monomer (A), 5 to 60 wt % of the monomer (B), and 0 to 20 wt % of the monomer (C) (total monomer content=100 wt %).

If the content of the monomer (A) is less than 30 wt %, the non-specific adsorption inhibition effect may be insufficient. If the content of the monomer (B) is less than 1 wt %, the non-specific adsorption inhibitor may precipitate or solidify in a high temperature range.

As the monomer used as the monomer unit, a monomer available as an industrial raw material may be used for copolymerization after or without purification.

The monomer unit may be polymerized by radical polymerization, anionic polymerization, cationic polymerization, or the like. It is preferable to utilize radical polymerization since the water-soluble polymer can be easily produced.

The monomer unit is polymerized by stirring and heating the monomer unit together with a solvent, an initiator, a chain transfer agent, and the like. The polymerization time is normally 30 minutes to 24 hours, and the polymerization temperature is about 0 to 120° C.

When using a cationic initiator such as 2,2'-azobis(2-methylpropionamidine)dihydrochloride ("V-50" manufactured by Wako Pure Chemical Industries, Ltd.) or 2,2'-azobis(1-imino-1-pyrrolidino-2-ethylpropane)dihydrochloride ("VA-067" manufactured by Wako Pure Chemical Industries, Ltd.) as the initiator, the non-specific adsorption inhibitor can be formed Coulomb coupling to an anionic solid-phase surface so that the non-specific adsorption inhibition effect can be improved. The initiator is preferably used in an amount of 0.2 to 5 parts by mass based on 100 parts by mass of the monomers in total. When using a cationic molecular weight modifier such as 2-mercaptoethylamine (cysteamine), 3-mercaptopropylamine, or 2-mercaptopropylamine as the chain transfer agent, the non-specific adsorption inhibitor can be formed Coulomb coupling to an anionic solid-phase surface in the same manner as in the case of using the cationic initiator, so that the non-specific adsorption inhibition effect can be improved. The molecular weight modifier is preferably used in an amount of 0.1 to 10 parts by mass based on 100 parts by mass of the monomers in total.

1.2. Properties and Application of Non-Specific Adsorption Inhibitor

The number average molecular weight of the non-specific adsorption inhibitor according to the present invention is normally 1000 to 1,000,000, preferably 2000 to 100,000, and more preferably 3000 to 50,000. The molecular weight distribution (weight average molecular weight/number average molecular weight) of the non-specific adsorption inhibitor (water-soluble polymer) according to this embodiment is normally 1.5 to 3.

The copolymer used as the non-specific adsorption inhibitor according to this embodiment is water-soluble. The term "water-soluble" used herein means that, when adding the copolymer to water so that the solid content is 1% and mixing the mixture at 25° C., the copolymer is dissolved in water so that the solution is transparent when observed with the naked eye.

The non-specific adsorption inhibitor according to this embodiment is applied to a container, an instrument, or the like, or added to a diluent, a reaction solvent, or a preservative used for a diagnostic reagent to reliably prevent non-specific adsorption of a protein or the like.

When using the non-specific adsorption inhibitor according to this embodiment in a diluent for an immunodiagnostic agent, a signal of a non-specific specimen can be suppressed.

When the non-specific adsorption inhibitor according to this embodiment is added to a protein solution as a stabilizer for a labelled antibody, a labeled antigen, an enzyme, a primary antibody, or a primary antigen used as a clinical diagnosis agent, a stabilizer for a protein contained in a plasma preparation, a stabilizer for an enzyme used for washing a contact lens, or the like, the non-specific adsorption inhibitor maintains the activity of the protein for a long time.

2. EXAMPLES

The invention is further described below by way of examples. Note that the invention is not limited to the following examples.

2.1. Example 1

70 g of diethylacrylamide (monomer (A)), 30 g of dimethylacrylamide (monomer (B)), and 2 g of cysteamine hydrochloride (chain transfer agent) were added to 900 g of water. The mixture was placed in a separable flask equipped with a stirrer. The mixture was then heated to 70° C. while bubbling nitrogen through the mixture. After the addition of 1 g of 2,2'-azobis(2-methylpropionamidine)dihydrochloride (initiator), the mixture was polymerized for two hours. The mixture was then heated to 80° C., aged for three hours, and cooled to room temperature. The resulting copolymer solution was purified by dialysis, and freeze-dried to obtain 69 g of a non-specific adsorption inhibitor (N-1) of Example 1.

The number average molecular weight and the weight average molecular weight of the non-specific adsorption inhibitor (N-1) determined by GPC were respectively 8000 and 16,000.

A 96-well polystyrene plate was filled with a 0.5% aqueous solution of the non-specific adsorption inhibitor (N-1). After incubation at 37° C. for 30 minutes, the plate was washed with ion-exchanged water five times. The plate was then filled with an aqueous solution of a horseradish peroxidase-labelled mouse IgG antibody ("AP124P" manufactured by Millipore). After incubation at room temperature for 30 minutes, the plate was washed with a PBS buffer three times. After coloring using 3,3',5,5'-tetramethylbenzidine (TMB)/hydrogen peroxide solution/sulfuric acid, the absorbance at 450 nm was measured. The absorbance thus measured was as low as 0.058. Therefore, it was confirmed that non-specific adsorption of the mouse IgG antibody was prevented. Note that the polymer did not precipitate or solidify during incubation at 37° C.

2.2. Example 2

A copolymer (N-2) was obtained in the same manner as in Example 1, except for using 85 g of diethylacrylamide (monomer (A)) and 15 g of acrylamide (monomer (B)) instead of 70 g of diethylacrylamide (monomer (A)) and 30 g of dimethylacrylamide (monomer (B)).

The number average molecular weight and the weight average molecular weight of the copolymer (N-2) determined by GPC were respectively 7200 and 15,000.

The absorbance of the copolymer (N-2) measured in the same manner as in Example 1 was 0.076. Therefore, it was confirmed that non-specific adsorption of the mouse IgG antibody was prevented. Note that the polymer did not precipitate or solidify during incubation at 37° C.

2.3. Example 3

A copolymer (N-3) was obtained in the same manner as in Example 1, except for using 70 g of N-isopropylacrylamide (monomer (A)) instead of 70 g of diethylacrylamide (monomer (A)).

The number average molecular weight and the weight average molecular weight of the copolymer (N-3) determined by GPC were respectively 6800 and 13,000.

The absorbance of the copolymer (N-3) measured in the same manner as in Example 1 was 0.18. Therefore, it was confirmed that non-specific adsorption of the mouse IgG antibody was prevented. Note that the polymer did not precipitate or solidify during incubation at 37° C.

2.4. Comparative Example 1

A polymer (X-1) was obtained in the same manner as in Example 1, except for using 100 g of diethylacrylamide (monomer (A)) instead of 70 g of diethylacrylamide (monomer (A)) and 30 g of dimethylacrylamide (monomer (B)).

The number average molecular weight and the weight average molecular weight of the polymer (X-1) determined by GPC were respectively 7800 and 16,000.

The absorbance of the polymer (X-1) measured in the same manner as in Example 1 was 0.21, which was higher to some extent than that of the non-specific adsorption inhibitor (N-1) of Example 1. The polymer precipitated and solidified during incubation at 37° C.

2.5. Comparative Example 2

A polymer (X-2) was obtained in the same manner as in Example 1, except for using 100 g of dimethylacrylamide (monomer (A)) instead of 70 g of diethylacrylamide (monomer (A)) and 30 g of dimethylacrylamide (monomer (B)).

The number average molecular weight and the weight average molecular weight of the polymer (X-2) determined by GPC were respectively 8400 and 17,000.

The absorbance of the polymer (X-2) measured in the same manner as in Example 1 was 1.8, which was significantly higher than that of the non-specific adsorption inhibitor (N-1) of Example 1. Note that the polymer did not precipitate or solidify during incubation at 37° C.

2.6. Comparative Example 3

The absorbance of the polymer (X-2) was measured in the same manner as in Example 1, except for using bovine serum albumin (BSA) instead of the non-specific adsorption inhibitor (N-1). The absorbance of the polymer (X-2) thus measured was 0.20, which was higher to some extent than that of the non-specific adsorption inhibitor (N-1) of Example 1. Note that the BSA did not precipitate or solidify during incubation at 37° C.

The invention claimed is:
1. A method of inhibiting non-specific adsorption, the method comprising:
   applying a non-specific adsorption inhibitor comprising a water-soluble polymer to a solid phase surface
   or adding a non-specific adsorption inhibitor comprising a water-soluble polymer to a diluent of a diagnostic agent, a reaction solvent of a diagnostic agent, or a preservative of a diagnostic agent,
   wherein the water-soluble polymer is obtained by polymerizing a monomer unit that comprises
   30 to 99 wt % of a monomer (A) that forms a polymer that has a lower critical solution temperature (LCST) of 80° C. or less in an aqueous solution under normal pressure,
   1 to 70 wt % of a monomer (B) that forms a polymer that does not have the LCST in an aqueous solution under normal pressure, and

0 to 49 wt % of a monomer (C) that comprises at least one of a carboxyl group-comprising anionic monomer, a sulfone group-comprising anionic monomer, an amino group-comprising cationic monomer, and a hydrophobic monomer, wherein the monomer (A) comprises at least one of N,N-diethylacrylamide, N-isopropylacrylamide, N-n-propylacrylamide, acryloylmorpholine, dimethylaminoethyl methacrylate, and vinyl methyl ether, and the monomer (B) is at least one selected from the group consisting of acrylamide, N,N-dimethylacrylamide, N-hydroxyethylacrylamide, hydroxyethyl acrylate, polyethylene glycol mono(meth)acrylate, polyethylene glycol monomethyl ether(meth)acrylate, glycerol(meth)acrylate, vinyl acetate, glycidyl(meth)acrylate, allyl glycidyl ether, N-vinylacetamide, N-vinylpyrrolidone, and allyl alcohol.

2. The method of claim 1, comprising applying a non-specific adsorption inhibitor comprising a water-soluble polymer to a solid phase surface, wherein the surface is a part of an instrument or a container.

3. The method of claim 1, wherein the monomer (B) comprises acrylamide.

4. The method of claim 1, wherein the monomer (B) comprises N,N-dimethylacrylamide.

5. The method of claim 1, wherein the monomer unit comprises monomer (C).

6. The method of claim 5, wherein the monomer (C) comprises at least one of styrenesulfonic acid, isoprenesulfonic acid, and 2-acrylamide-2-methylpropanesulfonic acid.

7. The method of claim 1, wherein the water soluble polymer has a number average molecular weight in a range of from 1000 to 1,000,000.

8. The method of claim 1, wherein the water soluble polymer has a number average molecular weight of from 6800 to 8000, and a weight average molecular weight of from 13,000 to 16,000.

9. The method of claim 1, wherein the monomer (A) comprises N,N-diethylacrylamide and the monomer (B) comprises N,N-dimethylacrylamide.

10. The method of claim 1, comprising applying said non-specific adsorption inhibitor comprising said water-soluble polymer to a solid phase surface.

11. The method of claim 1, comprising adding said non-specific adsorption inhibitor comprising said water-soluble polymer to a diluent of a diagnostic agent, a reaction solvent of a diagnostic agent, or a preservative of a diagnostic agent.

12. The method of claim 1, wherein the water soluble polymer has a molecular weight distribution of 1.5 to 3.

13. A method of inhibiting non-specific adsorption, the method comprising:

applying a non-specific adsorption inhibitor comprising a water-soluble polymer to a solid phase surface or adding a non-specific adsorption inhibitor comprising a water-soluble polymer to a diluent of a diagnostic agent, a reaction solvent of a diagnostic agent, or a preservative of a diagnostic agent, wherein the water-soluble polymer is obtained by polymerizing a monomer unit that comprises a monomer (A) that forms a polymer that has a lower critical solution temperature (LCST) of 80° C. or less in an aqueous solution under normal pressure, and a monomer (B) that forms a polymer that does not have the LCST in an aqueous solution under normal pressure, wherein the monomer (A) comprises N,N-diethylacrylamide.

14. The method of claim 13, wherein the monomer (B) comprises acrylamide.

15. The method of claim 13, wherein the monomer (B) comprises N,N-dimethylacrylamide.

16. A method of inhibiting non-specific adsorption, the method comprising:

applying a non-specific adsorption inhibitor comprising a water-soluble polymer to a solid phase surface or adding a non-specific adsorption inhibitor comprising a water-soluble polymer to a diluent of a diagnostic agent, a reaction solvent of a diagnostic agent, or a preservative of a diagnostic agent, wherein the water-soluble polymer is obtained by polymerizing a monomer unit that comprises a monomer (A) that forms a polymer that has a lower critical solution temperature (LCST) of 80° C. or less in an aqueous solution under normal pressure, and a monomer (B) that forms a polymer that does not have the LCST in an aqueous solution under normal pressure, wherein the water soluble polymer has a molecular weight distribution of 1.5 to 3.

17. The method of claim 16, wherein the monomer (A) comprises at least one of N,N-diethylacrylamide, N-isopropylacrylamide, N-n-propylacrylamide, acryloylmorpholine, dimethylaminoethyl methacrylate, and vinyl methyl ether and wherein the monomer (B) is at least one selected from the group consisting of acrylamide, N,N-dimethylacrylamide, N-hydroxyethylacrylamide, hydroxyethyl acrylate, polyethylene glycol mono(meth)acrylate, polyethylene glycol monomethyl ether(meth)acrylate, glycerol(meth)acrylate, vinyl acetate, glycidyl(meth)acrylate, allyl glycidyl ether, N-vinylacetamide, N-vinylpyrrolidone, and allyl alcohol.

18. The method of claim 16, wherein the monomer (A) comprises N,N-diethylacrylamide and the monomer (B) comprises N,N-dimethylacrylamide.

19. The method of claim 16, comprising applying said non-specific adsorption inhibitor comprising said water-soluble polymer to a solid phase surface.

20. The method of claim 16, comprising adding said non-specific adsorption inhibitor comprising said water-soluble polymer to a diluent of a diagnostic agent, a reaction solvent of a diagnostic agent, or a preservative of a diagnostic agent.

* * * * *